United States Patent [19]
Ueki

[11] Patent Number: 6,067,239
[45] Date of Patent: May 23, 2000

[54] SMOOTHING CIRCUIT FOR SWITCHING POWER SUPPLY

[75] Inventor: Kouichi Ueki, Saitama, Japan

[73] Assignee: Fuji Electric Co., Ltd., Kawasaki, Japan

[21] Appl. No.: 09/175,465

[22] Filed: Oct. 20, 1998

[30] Foreign Application Priority Data

Oct. 27, 1997 [JP] Japan ..................................... 9-293717
Nov. 28, 1997 [JP] Japan ..................................... 9-327510

[51] Int. Cl.$^7$ ...................................................... H02M 7/00

[52] U.S. Cl. ............................................................. 363/50

[58] Field of Search ................................... 363/20, 21, 39, 363/40, 44, 45, 50, 52, 54

[56] References Cited

U.S. PATENT DOCUMENTS

| | | | |
|---|---|---|---|
| 3,869,658 | 3/1975 | Hanke et al. | 363/39 |
| 4,020,409 | 4/1977 | Ishigaki et al. | 363/50 |
| 4,937,540 | 6/1990 | Carlson et al. | 363/39 |
| 5,247,239 | 9/1993 | Yamamura et al. | 363/272 |
| 5,420,777 | 5/1995 | Muto | 363/21 |

*Primary Examiner*—Matthew Nguyen
*Attorney, Agent, or Firm*—Kanesaka & Takeuchi

[57] ABSTRACT

A smoothing circuit for a switching power supply is formed of a combination of a reactor and a capacitor having a small equivalent internal resistance, and a MOSFET connected in series to the capacitor. The MOSFET is turned on by an output voltage of the smoothing circuit and has an ON-state resistance compensating for an equivalent internal resistance of the capacitor.

11 Claims, 5 Drawing Sheets

SMOOTHING CIRCUIT FOR SWITCHING POWER SUPPLY

BACKGROUND OF THE INVENTION AND RELATED ART STATEMENT

The present invention relates to a smoothing circuit used for a switching power supply for charging a battery and so on, and formed of a combination of a reactor and a capacitor.

In a smoothing circuit for a switching power supply formed of a combination of a reactor and a capacitor, a high switching frequency is used, and a film capacitor or a ceramic capacitor is used instead of an aluminum electrolytic capacitor in order to increase its life expectancy and reduce its size. FIG. 8 is a connection diagram showing an embodiment of a DC-DC converter section in a conventional switching power supply. In FIG. 8, 1 is a transformer; 2 is a switching element; 3 and 4 are diodes; 5 is a reactor; 6 is a capacitor; and 7 is a resistor. A control circuit for driving the switching element 2 is omitted. When a film capacitor or a ceramic capacitor is used as the capacitor 6, since its internal equivalent resistance is small, a control system for the DC-DC convertor section may become unstable. To stabilize the control system, the resistors 7, which have a small resistance value due to its parallel connection, are connected in series to the capacitor 6.

In addition, if a high-performance aluminum electrolytic capacitor is used as the capacitor 6, when the ambient temperature decreases to approximately −55° C., the internal equivalent resistance increases three to four times as compared to that at a room temperature (20° C.). Thus, to reduce the ripple voltage in the output at a low temperature or to reduce the voltage decrease caused by a rapid change in load, a film capacitor or a ceramic capacitor is connected parallel to the aluminum electrolytic capacitor.

When a battery is connected to an output end of a switching power supply for charging, in view of the situation that it is mistakenly connected in a reverse polarity or a battery having a voltage higher than the output voltage is mistakenly connected, the aluminum electrolytic capacitor, which is likely to be affected by a reverse voltage or an overvoltage, must be protected. FIG. 9 is a connection diagram showing another embodiment of a DC-DC convertor section of a conventional switching power supply. In FIG. 9, 12 is a diode; 13 is a relay coil; 13A is a contact of the relay coil 13; 21 is a battery of a normal polarity; and 22 is a battery of a reversed polarity. The other components are the same as those shown in FIG. 8 and have the same reference numerals. The relay coil 13 is excited to close the contact 13A only when the battery 21 is normally connected. If the battery 22 is connected in a reverse polarity, the diode 12 blocks an exciting current, so that the relay contact 13A remains open, thereby precluding a reversed voltage from being applied to the capacitor 6.

FIG. 10 is a connection diagram showing yet another embodiment of a DC-DC convertor section of a conventional switching power supply. In FIG. 10, 11 is a relay coil; and 11B is a contact of the relay coil 11. The other components are the same as those shown in FIG. 9 and have the same reference numerals. As an example of an overvoltage application, this figure shows two batteries 21 mistakenly connected in series. If one battery is used, the relay 11 does not operate, whereas if two batteries are used, the relay 11 operates to open the relay contact 11B, thereby preventing an overvoltage from being applied to the capacitor.

In a smoothing circuit for a switching power supply formed of a combination of a reactor and a capacitor, if a film capacitor or a ceramic capacitor is used to increase the life expectancy of the circuit and reduce its size, a resistor having a very small resistance value must be connected in series to such a capacitor. If the resistance value is small, that is, approximately 5 to 10 mΩ, 10 to 20 commercially available 100 mΩ resistors must be connected in parallel, thereby requiring a relatively large area on a printed circuit board to mount the parts thereon and increasing the parts and processing cost for the resistors and printed circuit board. In addition, in a shunt resistor, such as a manganic wire, since the resistance value depends on the length of the resistor, a certain wire length is always required to thereby increase the inductance of the resistor, thus increasing the output ripple voltage of the switching power supply. Accordingly, it is a first object of this invention to provide a smoothing circuit with an inexpensive resistor that is connected in series to a capacitor having a small equivalent internal resistance and that has a very small resistance value.

In addition, when an aluminum electrolytic capacitor is used, if the temperature increases, the equivalent internal resistance of the capacitor decreases to cause the control system unstable, thereby causing the output voltage to oscillate or increasing the output ripple voltage. In addition, when a high-performance aluminum electrolytic capacitor is used, in case a film capacitor or a ceramic capacitor is connected parallel to the aluminum electrolytic capacitor to reduce the ripple voltage in the output at a low temperature or to reduce the voltage decrease caused by a rapid change in load, if the electrostatic capacity of the film or ceramic capacitor is increased, the combined equivalent internal resistance of the capacitors is reduced. Accordingly, the control system becomes unstable at a high temperature, thereby causing the output voltage to oscillate or increasing the output ripple voltage. Thus, it is a second object of this invention to provide a smoothing circuit with a resistor that allows the control system to operate stably even at a high temperature if a capacitor, the equivalent internal resistance of which varies with the temperature, is used.

In addition, in a capacitor protection method using a relay, such as that shown in FIG. 9, when a battery of a normal polarity is connected and the relay is then turned on, a high charging current flows from the battery to the capacitor, thereby reducing the life expectancy of the relay contact or fusing the relay contact. Thus, it is a third object of this invention to provide a smoothing circuit, wherein the life expectancy of a relay contact used for a reverse-voltage protection circuit is increased.

In addition, in a capacitor protection method using a relay as shown in FIG. 10, the operational delay of the relay causes an overvoltage to be applied to the aluminum electrolytic capacitor for a short period of time, thereby causing the capacitor to be damaged or destroyed. Thus, it is a fourth object of this invention to provide a smoothing circuit with an overvoltage protection device that is not subjected to a time delay.

Also, in an overvoltage protection method using a relay as shown in FIG. 9, if the switching power supply stops operation in a condition that the battery is connected in a normal polarity, a relay exciting current continues to flow from the battery to cause the battery to consume unnecessary power. As a result, the electromotive force of the battery may be lost if it takes a long time to perform the stopping operation of the switching power supply. Thus, it is a fifth object of this invention to provide a smoothing circuit with a reverse-voltage protection circuit that can prevent the power of the battery from being consumed while the switching power supply is not in operation.

SUMMARY OF THE INVENTION

To achieve these objects, this invention provides a smoothing circuit for a switching power supply including a combination of a reactor and a capacitor having a small equivalent internal resistance, wherein the circuit includes a MOSFET that is connected in series with the capacitor and that is turned on by an output voltage. The ON-state resistance of the MOSFET compensates for the equivalent internal resistance of the capacitor.

In addition, this invention provides a smoothing circuit for a switching power supply including a combination of a reactor and a capacitor, the equivalent internal resistance of which decreases as the ambient temperature increases, wherein the circuit includes a MOSFET that is connected in series with the capacitor and that is turned on by an output voltage. The ON-state resistance of the MOSFET, that increases as the ambient temperature of the MOSFET increases, compensates for the equivalent internal resistance of the capacitor.

A smoothing circuit for a switching power supply includes a combination of a reactor, a first capacitor, the equivalent internal resistance of which decreases as the ambient temperature increases, and a second capacitor having a small equivalent internal resistance, wherein the circuit includes a thermistor and a resistor connected in series to divide an output voltage; and a MOSFET is connected in series with the second capacitor and is turned on by the voltage divided by the thermistor and resistor. As the ambient temperature of the thermistor increases, the voltage divided by the thermistor and resistor is reduced to increase the ON-state resistance of the MOSFET in order to compensate for the combined equivalent internal resistance of the first and second capacitors.

In addition, to protect the circuit from a reverse voltage, this invention provides a configuration including between output terminals a series-connection of a diode and a relay coil for blocking an exciting current when a battery is connected between the output terminals in a reverse polarity; and a relay contact that connects the capacitor to the output terminals when the relay coil is excited. The circuit includes a resistor connected between the drain and source of the MOSFET, and a resistor connected in series with the gate of the MOSFET. The resistor connected in series with the gate of the MOSFET serves to increase the operation time until the MOSFET is turned on. During the delay time, the resistor connected between the drain and the source of the MOSFET limits a charging current to the capacitor.

In addition, this invention provides a configuration including means for detecting an overvoltage applied between the output terminals, wherein when the overvoltage is detected, the output from the overvoltage detection means turns the gate of the MOSFET off to separate the capacitor from the output terminals.

In addition, to protect the circuit from reverse voltage as described above, this invention provides a configuration including between the output terminals a series connection of a diode and a first relay coil for blocking an exciting current when a battery is connected between the output terminals in a reverse polarity, and also including a relay contact that connects the capacitor to the output terminals when the first relay coil is excited; a resistor connected between the drain and source of the MOSFET; and a resistor connected in series with the gate of the MOSFET. The circuit further includes a second relay excited by a switching power-supply activation signal; and a contact that is turned on when the second relay is excited is connected in series with the first relay coil.

DETAILED DESCRIPTION OF PREFERRED EMBODIMENTS

Figure 1:
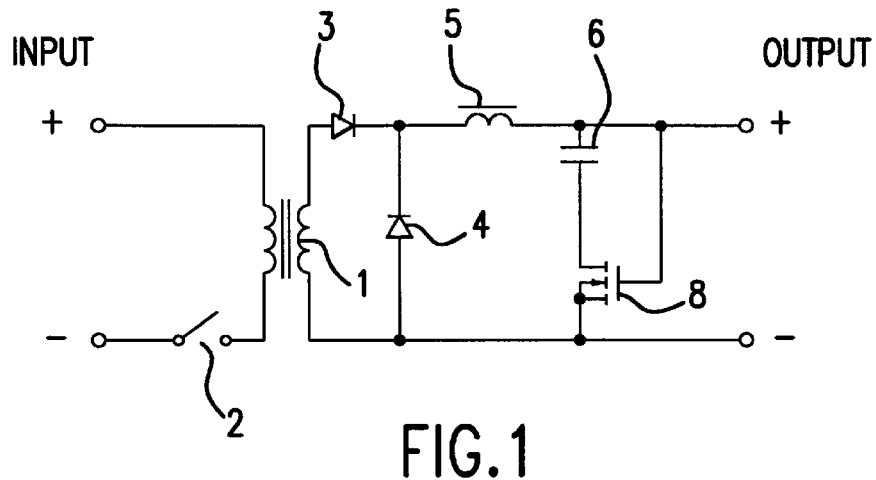
FIG. 1 is a connection diagram showing a first embodiment of this invention.
Figure 8:
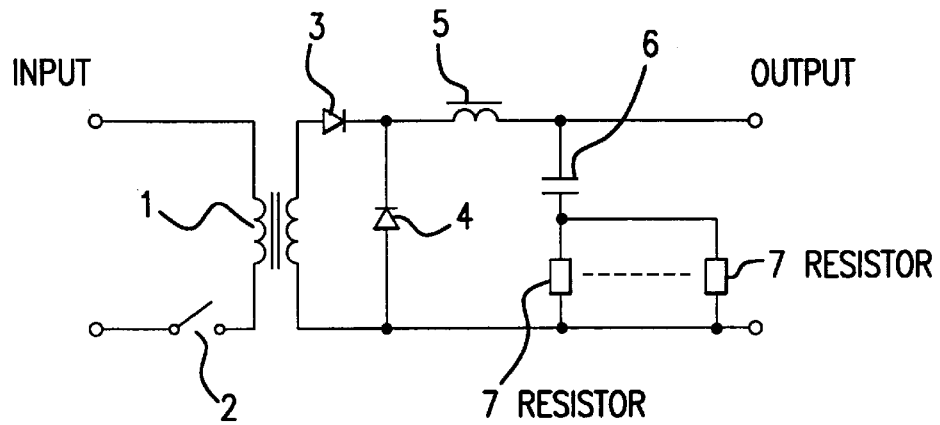
FIG. 8 is a connection diagram showing a conventional embodiment.

FIG. 1 is a connection diagram of a DC-DC converter section of a switching power supply showing a first embodiment of this invention. In this figure, 8 is a MOSFET and the other components are the same as those shown in FIG. 8 and have the same reference numerals. A control circuit driving the switching element 2 is omitted. When a capacitor, such as a film capacitor or a ceramic capacitor, that has a small equivalent internal resistance is used as the capacitor 6, a MOSFET 8 having an ON-state resistance equivalent to a resistance value where the control system for the DC-DC converter operates stably is connected in series to the capacitor 6. When the output voltage rises and exceeds the gate threshold of the MOSFET 8, the MOSFET 8 is turned on.

In addition, if a capacitor such as an aluminum electrolytic capacitor, the equivalent internal resistance of which decreases as the ambient temperatures increases, is used as the capacitor 6, a MOSFET 8 having an ON-state resistance that increases as the ambient temperature increases is connected in series to the capacitor 6. In this case, compensation effects are improved by mounting the MOSFET 8 as close as possible to the capacitor 6.

Figure 2:
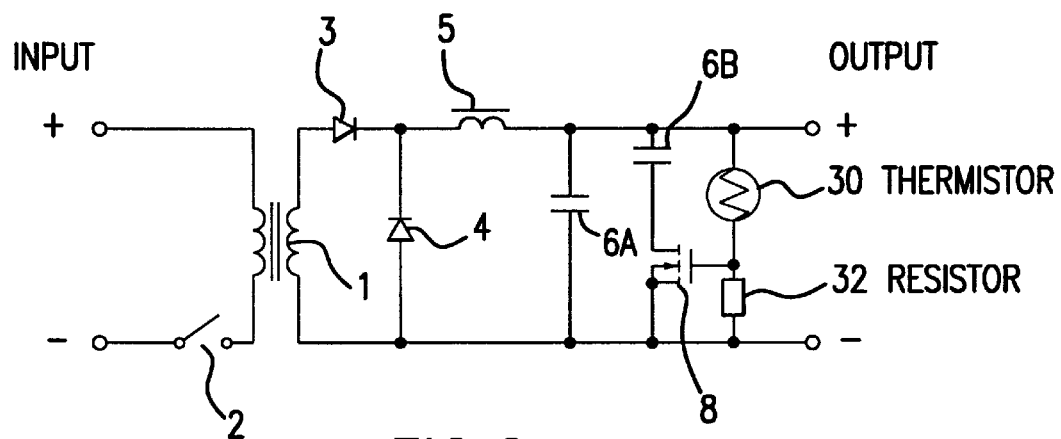
FIG. 2 is a connection diagram showing a second embodiment of this invention.

FIG. 2 is a connection diagram of a DC-DC converter section of a switching power supply showing a second embodiment of this invention. In this figure, 6A is an aluminum electrolytic capacitor; 6B is a film capacitor; 30 is a positive-temperature coefficient thermistor; and 32 is a resistor. The other components are the same as those shown in FIG. 1 and have the same reference numerals. Since the resistance value of the thermistor 30 increases as the ambient temperature increases, the gate voltage of the MOSFET 8 decreases to increase the ON-state resistance of the MOSFET 8. Thus, the equivalent internal resistance of the film capacitor 6B apparently increases to compensate for the decrease in the equivalent internal resistance of the aluminum electrolytic capacitor 6A caused by rising of the ambient temperature.

On the contrary, if the ambient temperature decreases, the resistance value of the thermistor 30 decreases, the gate voltage of the MOSFET 8 increases, the ON-state resistance of the MOSFET 8 decreases, and the equivalent internal resistance of the film capacitor 6B apparently decreases, to thereby compensate for the increase in the equivalent internal resistance of the aluminum electrolytic capacitor 6A caused by lowering of the ambient temperature. Therefore, the combined equivalent internal resistance of the two capacitors can be maintained at an almost constant value in spite of the change of the ambient temperature, thereby enabling the control system for the DC-DC converter to operate stably.

Figure 3:
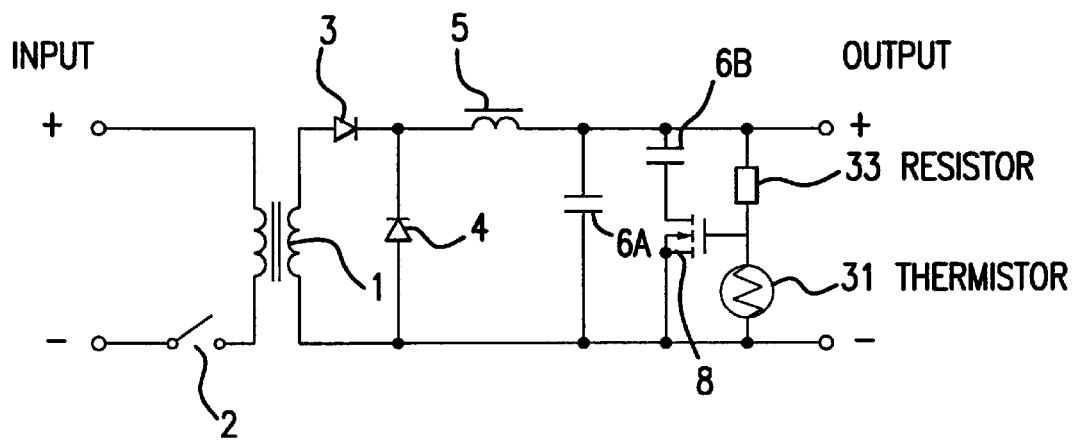
FIG. 3 is a connection diagram showing a third embodiment of this invention.

FIG. 3 is a connection diagram of a DC-DC converter section of a switching power supply showing a third embodiment of this invention. In this figure, 31 is a negative temperature-coefficient thermistor; and 33 is a resistor. The other components are the same as those shown in FIG. 2 and have the same reference numerals. FIG. 3 differs from FIG. 2 in that the negative-temperature-coefficient thermistor is used instead of the positive-temperature-coefficient thermistor, and the thermistor and resistor are reversely arranged. Since the resistance value of the thermistor 31 decreases with an increase in the ambient temperature, the gate voltage of the MOSFET 8 decreases as in FIG. 2. Regardless of the change of the ambient temperature, as in the embodiment shown in FIG. 2, the combined equivalent internal resistance of the two capacitors can be maintained at an almost constant value, thereby enabling the control system for the DC-DC converter to operate stably.

Figure 4:
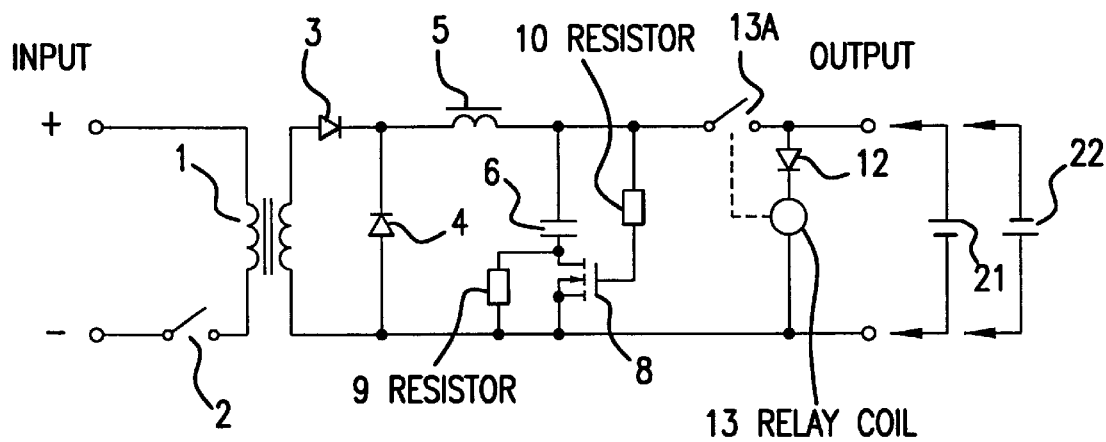
FIG. 4 is a connection diagram showing a fourth embodiment of this invention.
Figure 9:
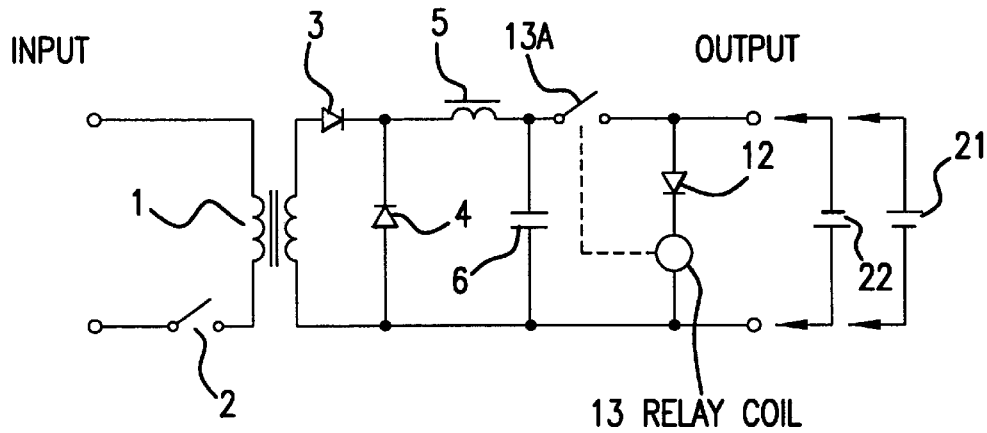
FIG. 9 is a connection diagram showing another conventional embodiment.

FIG. 4 is a connection diagram showing a fourth embodiment of this invention. In this figure, 8 is a MOSFET; and 9 and 10 are resistors. The other components are the same as those shown in FIG. 9 and have the same reference numerals. When the battery 22 is reversely connected to the output terminals, since the diode 12 prevents an exciting current from flowing through the relay coil 13, the relay contact 13A remains open and the capacitor 6 remains separate. When the battery 21 is connected in a normal polarity, an exciting current flows through the relay coil 13 to close the relay contact 13A. At this point, if the MOSFET 8 is immediately turned on, a high charging current flows from the battery 21 to the capacitor 6 to damage the relay contact 13A. To prevent this, the MOSFET 8 is not turned on until a predetermined length of time has passed after the relay contact 13A has been turned on, and during this period, the charging current from the battery 21 to the capacitor 6 is limited to a predetermined maximum value by the resistor 9. The length of time required until the MOSFET 8 is turned on can be determined by the time constant determined by the product of the resistance of the resistor 10 and the electrostatic capacity between the gate and source of the MOSFET 8, and by the voltage of the battery 21 and the gate threshold of the MOSFET 8.

Figure 5:
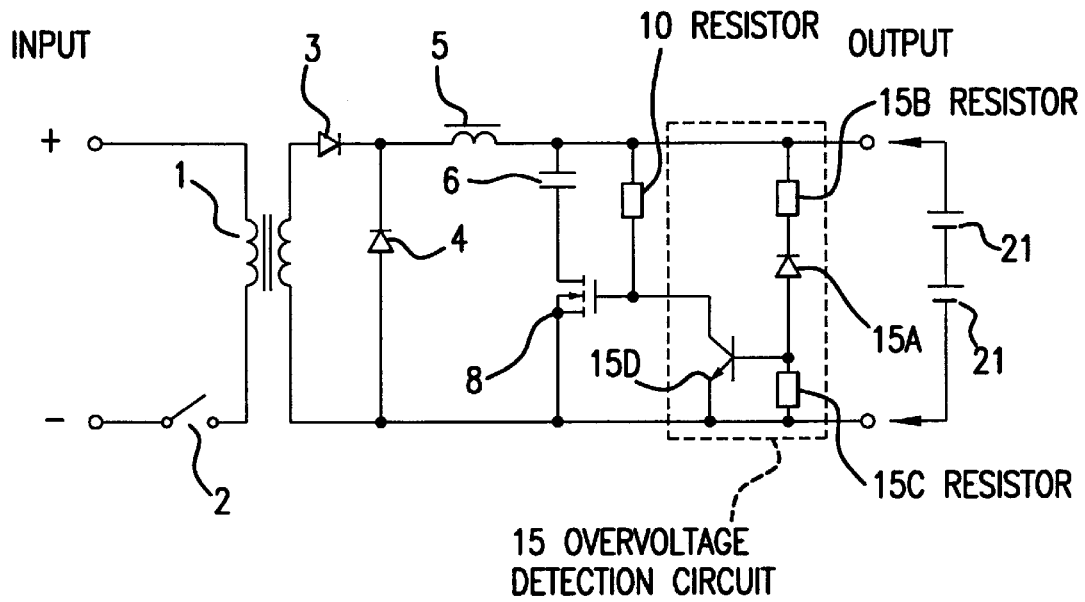
FIG. 5 is a connection diagram showing a fifth embodiment of this invention.
Figure 10:
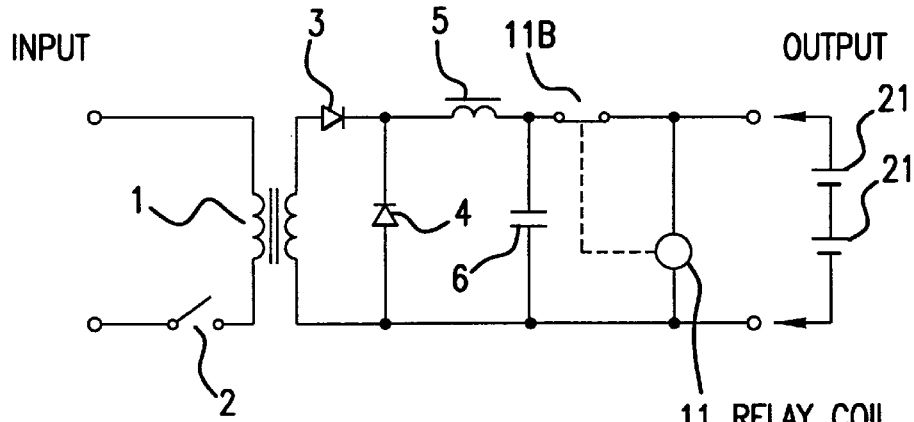
FIG. 10 is a connection diagram showing yet another conventional embodiment.

FIG. 5 is a connection diagram showing a fifth embodiment of this invention. In this figure, 8 is a MOSFET; 10 is a resistor; 15 is an overvoltage detection circuit; 15A is a constant-voltage diode; 15B and 15C are resistors; and 15D is a transistor. The other components are the same as those shown in FIG. 10 and have the same reference numerals. Like FIG. 10, FIG. 5 illustrates two batteries 21 erroneously connected in series as an example of the overvoltage application. If one battery 21 is used, the constant-voltage diode 15A is not conductive and the transistor 15D remains off. If two batteries 21 are used, the constant-voltage diode 15A becomes conductive and the transistor 15D is turned on. Then, the MOSFET 8 is turned off to separate the capacitor 6 in order to prevent an excessive voltage from being applied to the capacitor.

Figure 6:
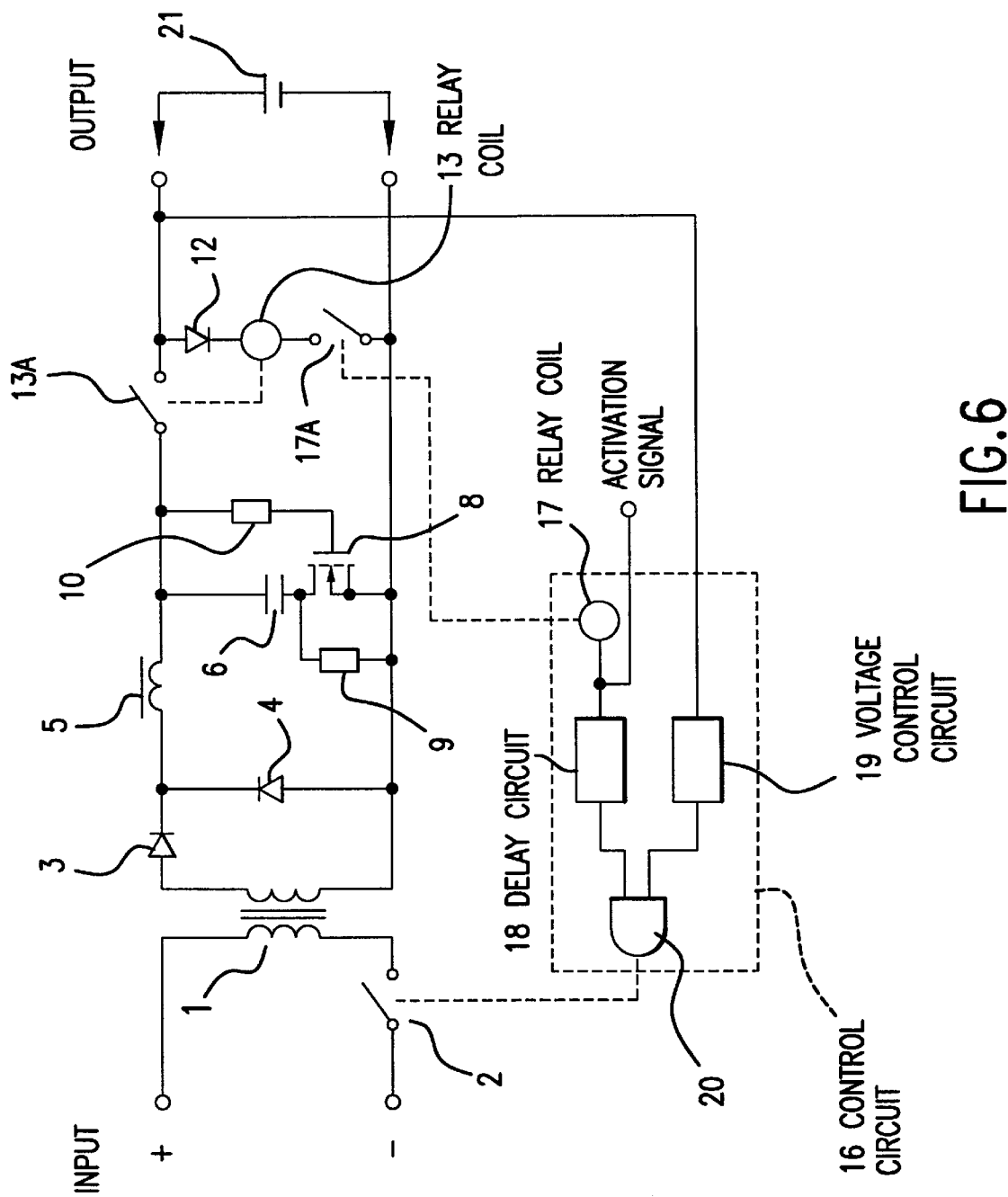
FIG. 6 is a connection diagram showing a sixth embodiment of this invention.
Figure 7:
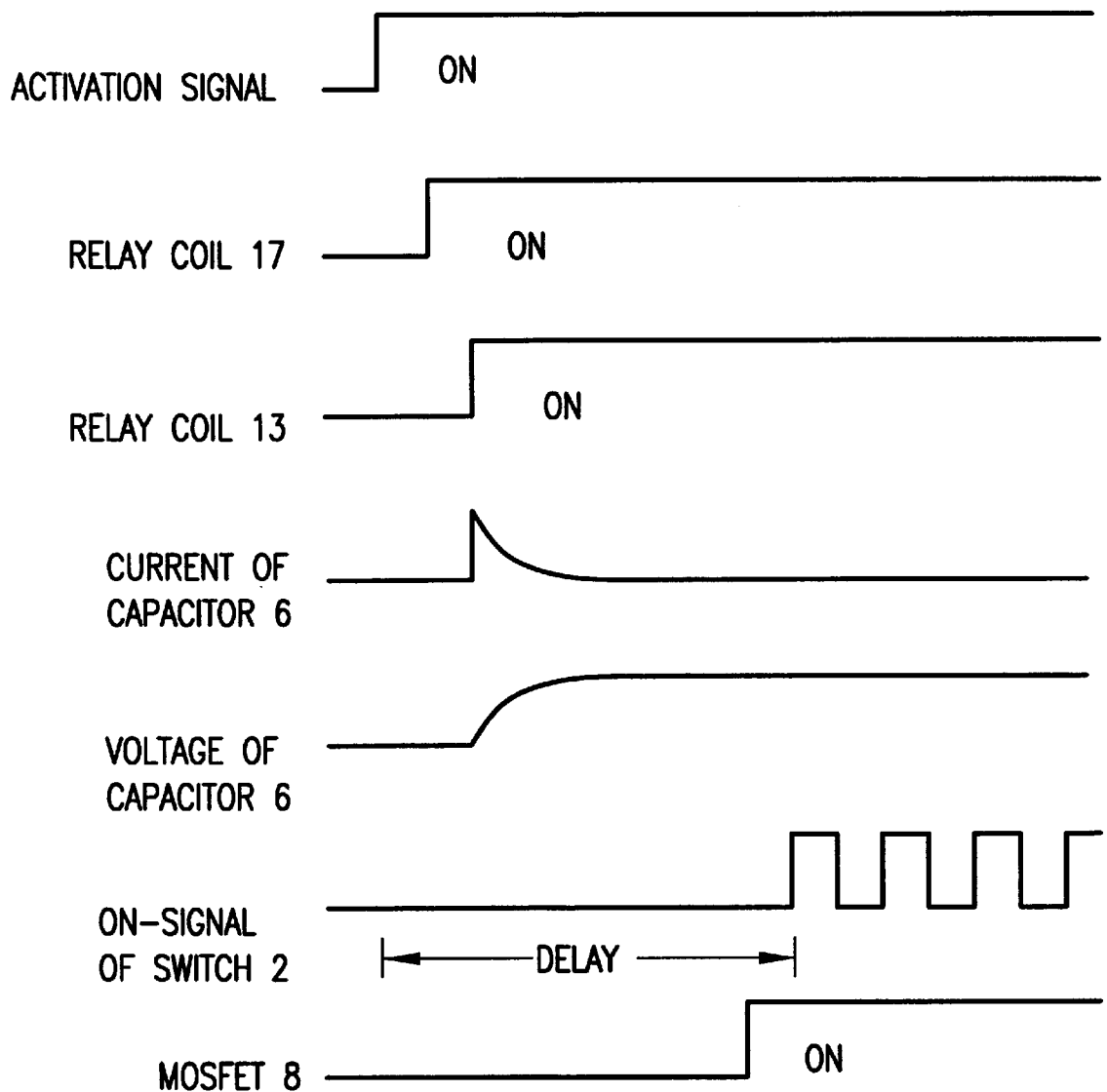
FIG. 7 is a time chart showing an operation of the embodiment in FIG. 6.

FIG. 6 is a connection diagram showing a sixth embodiment of this invention, and FIG. 7 is a time chart showing its operation. In FIG. 6, 16 is a control circuit; 17 is a relay coil excited by an activation signal that activates the DC-DC converter; 17A is a contact of the relay coil 17; 18 is a delay circuit for delaying the activation signal for a predetermined length of time; 19 is a voltage control circuit for driving the switching element 2 to control the DC-DC converter; and 20 is an AND circuit. The other components are the same as those shown in FIG. 4 and have the same reference numerals.

The operation is explained with reference to FIG. 7. While the DC-DC converter is not operating, since the relay contact 17A remains off, the relay contact 13A also remains off to preclude the power of the battery 21 connected to the output terminals from being consumed by the DC-DC converter. When the activation signal for the DC-DC converter is turned on, the relay coil 17 is excited and the relay contact 17A is turned on after the operation delay of the relay. The relay coil 13 is in turn excited and the relay contact 13A is turned on after the operation delay of the relay. The capacitor 6 is charged with a current from the battery 21 that is limited by the resistor 9, thereby increasing the voltage of the capacitor 6. The gate potential of the MOSFET 8 increases according to the time constant determined by the product of the resistance of the resistor 10 and the electrostatic capacity between the gate and source of the MOSFET 8. When the gate potential reaches the threshold, the MOSFET 8 is turned on and the DC-DC converter is ready for activation. After the activation signal has been delayed for a predetermined length of time, the AND circuit 20 is turned on and the voltage control circuit 19 starts to operate the switching power supply.

In contrast to the conventional techniques, which require multiple resistors, this invention requires only one inexpensive MOSFET to allow the control system to operate stably, and thus provides significant economic benefits. In addition, since the current-limiting resistor can reduce the charging current to the capacitor less than one order, i.e. one tenth, of the magnitude, the price of the MOSFET to be used can be significantly reduced and the reliability of the relay contact can be substantially improved.

What is claimed is:

1. A smoothing circuit for a switching power supply, comprising:

a combination of a reactor, and a capacitor connected to the reactor and having an equivalent internal resistance, and a MOSFET connected in series to the capacitor and having a gate connected to a connecting point between the reactor and the capacitor, said MOSFET being turned on by an output voltage of the smoothing circuit and having an ON-state resistance compensating for the equivalent internal resistance of the capacitor.

2. A smoothing circuit for a switching power supply according to claim 1, wherein said equivalent internal resistance of the capacitor decreases as an ambient temperature increases, and the ON-state resistance of the MOSFET increases as the ambient temperature increases to compensate for the equivalent internal resistance of the capacitor.

3. A smoothing circuit for a switching power supply, comprising:

a reactor, a first capacitor connected to the reactor and having an equivalent internal resistance which decreases as an ambient temperature increases, a second capacitor connected to the reactor and having an equivalent internal resistance, a thermistor and a resistor connected in series to divide an output voltage of the smoothing circuit, and a MOSFET connected in series to the second capacitor and being turned on by an output voltage divided by the thermistor and resistor, said MOSFET having an ON-state resistance and operating such that as the ambient temperature increases, the output voltage divided by the thermistor and resistor is reduced to thereby increase the ON-state resistance so that a combined equivalent internal resistance of the first and second capacitors is compensated.

4. A smoothing circuit for a switching power supply according to claim 1, further comprising a first relay formed of a series connection of a diode and a relay coil and situated between output terminals of the smoothing circuit for blocking an exciting current when a battery is connected in reverse polarity between the output terminals; a first relay contact situated between the capacitor and one of the output terminals and being actuated by the relay coil, said first relay contact connecting the capacitor and the one of the output terminals when the relay coil is excited, a first resistor situated between a drain and a source of the MOSFET; and a second resistor connected to the gate of the MOSFET.

5. A smoothing circuit for a switching power supply according to claim 4, wherein said second resistor is connected at one end to the gate of the MOSFET and at the other end to a portion between the first relay contact and the capacitor.

6. A smoothing circuit for a switching power supply according to claim 4, further comprising a second relay excited by a switching power-supply activation signal, and a second relay contact connected in series to the first relay, said second relay being turned on when the second relay is excited.

7. A smoothing circuit for a switching power supply according to claim 6, further comprising a delay circuit connected to the second relay, a voltage control circuit, and an AND circuit connected to the delay circuit and the voltage control circuit for activating a switching power supply.

8. A smoothing circuit for a switching power supply according to claim 1, further comprising means for detecting an overvoltage applied between output terminals of the smoothing circuit and connected to the gate of the MOSFET, said detecting means, when an overvoltage is detected, outputting a signal to turn the gate of the MOSFET off to thereby separate the capacitor from the output terminals.

9. A smoothing circuit for a switching power supply according to claim 8, wherein said detecting means includes a diode situated between the output terminals for allowing an electric signal to pass only when the overvoltage is applied between the output terminals, and a transistor connected to the diode and the gate of the MOSFET to provide the signal for turning the MOSFET off when the overvoltage passes through the diode.

10. A smoothing circuit for a switching power supply according to claim 1, wherein said capacitor becomes conductive when the output voltage of the smoothing circuit increases to exceed an on-threshold value of the MOSFET to thereby turn on the MOSFET.

11. A smoothing circuit for a switching power supply according to claim 10, wherein said capacitor and MOSFET are arranged in series between output terminals of the smoothing circuit.

* * * * *